United States Patent
Eshima

(10) Patent No.: US 11,634,117 B2
(45) Date of Patent: Apr. 25, 2023

(54) PARKING SUPPORT APPARATUS

(71) Applicant: TOYOTA JIDOSHA KABUSHIKI KAISHA, Toyota (JP)

(72) Inventor: Kazuhito Eshima, Fuji (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 198 days.

(21) Appl. No.: 16/292,694

(22) Filed: Mar. 5, 2019

(65) Prior Publication Data

US 2019/0276011 A1   Sep. 12, 2019

(30) Foreign Application Priority Data

Mar. 6, 2018   (JP) .............................. JP2018-039872

(51) Int. Cl.
 *B60W 30/06*   (2006.01)
 *G05D 1/00*   (2006.01)
 *G05D 1/02*   (2020.01)

(52) U.S. Cl.
 CPC .......... *B60W 30/06* (2013.01); *G05D 1/0088* (2013.01); *G05D 1/021* (2013.01); *B60W 2552/00* (2020.02); *B60W 2900/00* (2013.01); *G05D 2201/0213* (2013.01)

(58) Field of Classification Search
 CPC ............. B60W 30/06; B60W 2552/00; B60W 2900/00; G05D 1/0088; G05D 1/021; G05D 2201/0213
 See application file for complete search history.

(56) References Cited

U.S. PATENT DOCUMENTS

| | | | |
|---|---|---|---|
| 10,583,828 B1* | 3/2020 | Han | G08G 1/141 |
| 11,099,015 B2* | 8/2021 | Yanagida | G01C 21/3407 |
| 11,498,553 B2* | 11/2022 | Tsujino | B60W 30/06 |
| 2003/0088344 A1 | 5/2003 | Oda et al. | |
| 2016/0144857 A1 | 5/2016 | Ohshima | |
| 2016/0203377 A1* | 7/2016 | Irie | H04N 5/232945 348/118 |
| 2017/0369078 A1* | 12/2017 | Freistadt | B62D 15/0285 |
| 2018/0022345 A1 | 1/2018 | Seo et al. | |
| 2018/0024559 A1* | 1/2018 | Seo | G05D 1/021 701/23 |
| 2018/0180731 A1 | 6/2018 | Inoue et al. | |

(Continued)

FOREIGN PATENT DOCUMENTS

| CN | 107640148 A | 1/2018 |
|---|---|---|
| JP | 3980868 B2 | 9/2007 |

(Continued)

*Primary Examiner* — Dale W Hilgendorf
*Assistant Examiner* — Hana Lee
(74) *Attorney, Agent, or Firm* — Sughrue Mion, PLLC

(57) ABSTRACT

A parking support apparatus is configured to automatically park a target vehicle in a target parking space, which is one parking space out of a plurality of parking spaces. The parking support apparatus is provided with: an acquirer configured to obtain parking information indicating a parking posture of a parked vehicle in one or a plurality of parking spaces around the target parking space, out of the plurality of parking spaces; and a determinator configured to determine a parking posture of the target parking vehicle with respect to the target parking space, on the basis of the obtained parking information.

3 Claims, 1 Drawing Sheet

(56) References Cited

U.S. PATENT DOCUMENTS

2020/0062242 A1    2/2020  Hayakawa
2021/0179087 A1*   6/2021  Tsujino .................. G08G 1/141

FOREIGN PATENT DOCUMENTS

| JP | 2009051267 A | * | 3/2009 |
| JP | 2009-202609 A | | 9/2009 |
| JP | 2013052754 A | * | 3/2013 |
| JP | 2016-099953 A | | 5/2016 |
| WO | 2017/060975 A1 | | 4/2017 |
| WO | 2017/068698 A1 | | 4/2017 |

\* cited by examiner

PARKING SUPPORT APPARATUS

CROSS-REFERENCE TO RELATED APPLICATIONS

This application is based upon and claims the benefit of priority of the prior Japanese Patent Application No. 2018-039872, filed on Mar. 6, 2018, the entire contents of which are incorporated herein by reference.

BACKGROUND

1. Technical Field

Embodiments of the present disclosure relate to a parking support apparatus.

2. Description of the Related Art

For this type of apparatus, for example, there is proposed an apparatus configured to allow automatic driving of a host vehicle in a parking lot, on condition that a passing direction on a passage for one vehicle in the parking lot is determined to be one direction, and configured to park the host vehicle in a desired parking space of the parking lot by the automatic driving (refer to Japanese Patent Application Laid Open No. 2016-099953).

In the technology/technique disclosed in the Patent Literature 1, there is no mention about which is selected between back parking and advance parking when the host vehicle is parked in the parking space. If a user needs to select one from the back parking and the advance parking, or in other words, if the user needs to determine a parking posture of the host vehicle after parking with respect to the parking space, then, the user's convenience is possibly reduced.

SUMMARY OF INVENTION

In view of the aforementioned problems, it is therefore an object of embodiments of the present disclosure to provide a parking support apparatus configured to automatically determine the parking posture with respect to the parking space.

The above object of embodiments of the present disclosure can be achieved by a parking support apparatus configured to automatically park a target vehicle in a target parking space, which is one parking space out of a plurality of parking spaces, the parking support apparatus provided with: an acquirer configured to obtain parking information indicating a parking posture of a parking vehicle in one or a plurality of parking spaces around the target parking space, out of the plurality of parking spaces; and a determinator configured to determine a parking posture of the target parking vehicle with respect to the target parking space, on the basis of the obtained parking information.

DETAILED DESCRIPTION OF THE EMBODIMENTS

A parking support apparatus according to an embodiment of the present disclosure will be explained with reference to FIG. 1 and FIG. 2.

(Configuration)

A configuration of the parking support apparatus according to the embodiment will be explained with reference to FIG. 1. FIG. 1 is a block diagram illustrating the configuration of the parking support apparatus according to the embodiment.

Figure 1:
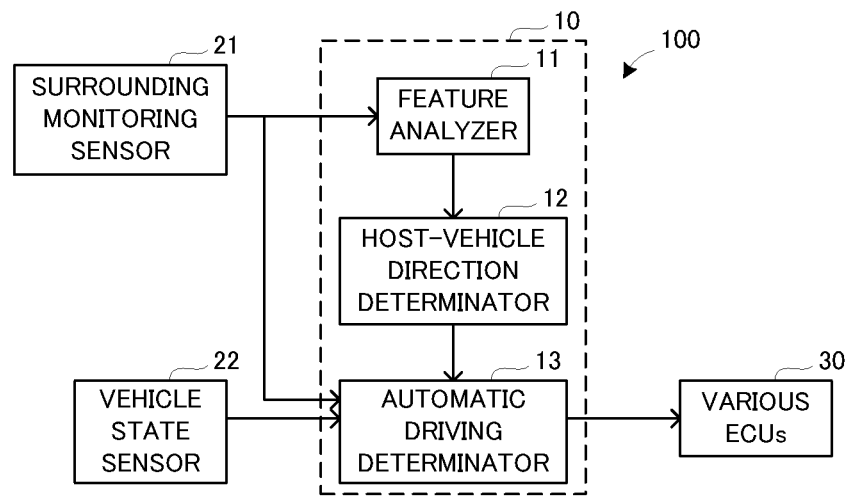
FIG. 1 is a block diagram illustrating a configuration of a parking support apparatus according to an embodiment.

In FIG. 1, a parking support apparatus 100 is mounted on a vehicle 1. The vehicle 1 is provided with an automatic driving apparatus 10, a surrounding monitoring sensor 21, a vehicle state sensor 22, and various electronic control units (ECUs) 30. The vehicle 1 is configured to perform automatic driving by using the automatic driving apparatus 10.

The surrounding monitoring sensor 21 may include, for example, at least one of a camera, a laser sensor, a millimeter wave radar, an ultrasonic sensor, and the like. Various existing aspects can be applied to the surrounding monitoring sensor 21, and a detailed explanation of the surrounding monitoring sensor 21 will be thus omitted.

The vehicle state sensor 22 may include, for example, sensors that can detect various states of the vehicle 1, such as a vehicle speed sensor, a steering angle sensor, and a shift sensor. Various existing aspects can be applied to the vehicle state sensor 22, and a detailed explanation of the vehicle state sensor 22 will be thus omitted.

The various ECUs 30 may include, for example, an engine ECU, a motor ECU, a hybrid ECU, a brake ECU, a steering ECU, and the like. Various existing aspects can be applied to the various ECUs 30, and a detailed explanation of the various ECUs 30 will be thus omitted.

The automatic driving apparatus 10 is configured to calculate a driving route on which the vehicle 1 is to run, for example, on the basis of an output of the surrounding monitoring sensor 21. Then, the automatic driving apparatus 10 is configured to control the various ECUs 30 on the basis of an output of the vehicle state sensor 22 so that the vehicle 1 runs along the driving route.

In the embodiment, an explanation will be given to an operation when the automatic driving apparatus 10 parks the vehicle 1 in a target parking space by using the automatic driving. The automatic driving apparatus 10 is provided with a feature analyzer 11, a host-vehicle direction determinator 12, and an automatic driving determinator 13, as processing blocks logically realized therein or processing circuits physically realized therein.

Here, the feature analyzer 11 and the host-vehicle direction determinator 12 constitute the parking support apparatus 100. In other words, in the embodiment, the parking support apparatus 100 may be a part of the automatic driving apparatus 10.

The feature analyzer 11 is configured to determine a parking direction of another parking vehicle that exists around a target parking space in which the vehicle 1 is to be parked, on the basis of the output of the surrounding monitoring sensor 21, when the vehicle 1 is to be parked. Specifically, if the surrounding monitoring sensor 21 includes a camera, the feature analyzer 11 may use a pattern recognition technique/technology, which uses images taken by the camera, thereby determining the parking direction of another parking vehicle. Here, the parking direction when the vehicle performs the back parking is referred to "backward parking", and the parking direction when the vehicle performs the advance parking is referred to "forward parking".

The host-vehicle direction determinator 12 is configured to determine the parking direction of the vehicle 1 on the basis of the parking direction of another parking vehicle determined by the feature analyzer 11. Specifically, the host-vehicle direction determinator 12 may determine that the parking direction of the vehicle 1 is the backward parking, if there are a larger number of parking vehicles that are backward parked than the parking vehicle that are forward parked. Alternatively, the host-vehicle direction determinator 12 may determine that the parking direction of the vehicle 1 is the forward parking, if there are a larger number of parking vehicles that are forward parked than the parking vehicles that are backward parked.

The automatic driving determinator 13 is configured to calculate the driving route of the vehicle in parking, for example, on the basis of a current position of the vehicle 1, a position of the target parking space, the parking direction determined by the host-vehicle direction determinator 12, and the like. Various existing aspects can be applied to a method of calculating the driving route, and a detailed explanation of the method will be thus omitted.

(Parking Support Process)

Next, a parking support process performed by the automatic driving apparatus 10 will be explained with reference to a flowchart in FIG. 2.

Figure 2:
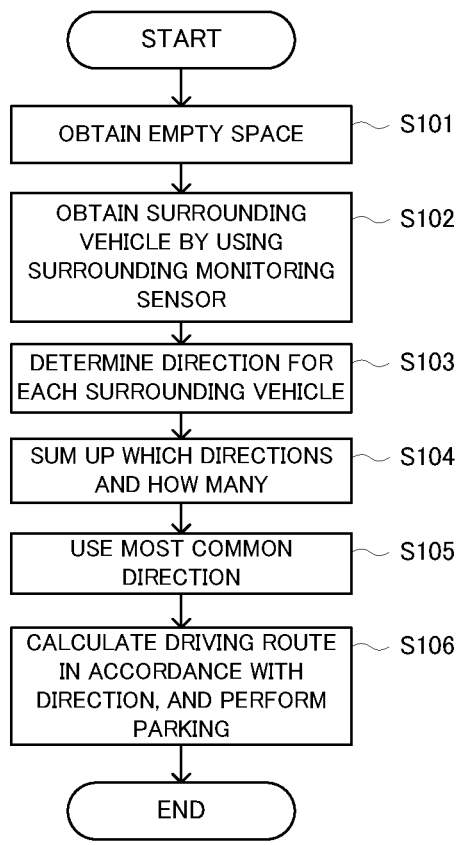
FIG. 2 is a flowchart illustrating a parking support process according to the embodiment.

In FIG. 2, the automatic driving apparatus 10 obtains a position of an empty parking space, i.e., a parking space in which there is no parking vehicle, from a plurality of parking spaces of the parking lot (step S101). The position of the empty parking space may be obtained, for example, on the basis of the output of the surrounding monitoring sensor 21, or from an apparatus provided on the parking lot side. The automatic driving apparatus 10 may determine the target parking space in which the vehicle 1 is to be parked, from the position of the empty parking space.

The feature analyzer 11 then obtains information associated with one or a plurality of parking vehicles (i.e., another vehicle) that exists around the target parking space, on the basis of the output of the surrounding monitoring sensor 21 (step S102). The feature analyzer 11 then determines respective parking directions of the one or the plurality of parking vehicles, on the basis of the output of the surrounding monitoring sensor 21 (step S103).

The host-vehicle direction determinator 12 then sums up the respective parking directions of the one or the plurality of parking vehicles (step S104). A result of the step S104 may be expressed, for example, as the number of the parking vehicles, or as a ratio or a percentage. If the result of the step S104 is expressed as a ratio or a percentage, the host-vehicle direction determinator 12 may set the number of the parking vehicles as a population parameter for obtaining the ratio and the percentage.

The host-vehicle direction determinator 12 then determines the most common parking direction of the respective parking directions of the one or the plurality of parking vehicles, to be the parking direction of the vehicle 1, on the basis of the result of the step S104 (step S105). The automatic driving determinator 13 may then calculate the driving route of the vehicle 1 in parking, for example, on the basis of the parking direction determined by the host-vehicle direction determinator 12 or the like. The automatic driving determinator 13 then controls the various ECUs 30 on the basis of the output of the vehicle state sensor 22 so that the vehicle 1 runs along the driving route (step S106).

(Technical Effect)

According to the parking support apparatus 100, it is possible to determine the parking direction of the vehicle 1 on the basis of the parking direction of the parking vehicle. Since the parking direction of the vehicle 1 is automatically determined by the parking support apparatus 100, it is possible to improve the user's convenience, for example, in comparison with an apparatus according to a comparative example in which the user determines the parking direction.

FIRST MODIFIED EXAMPLE

The host-vehicle direction determinator 12 may determine a standard parking direction in advance, as the parking direction of the vehicle 1. In this case, in the step S105 described above, if the number of the parking vehicles that are parked in a different direction from the standard parking direction is less than a predetermined value, the host-vehicle direction determinator 12 may determine the parking direction of the vehicle 1 to be the standard parking direction. On the other hand, in the step S105 described above, if the number of the parking vehicles that are parked in the different direction from the standard parking direction is greater than or equal to the predetermined value, the host-vehicle direction determinator 12 may determine the parking direction of the vehicle 1 to be a different parking direction from the standard parking direction (i.e., to be the forward parking if the standard parking direction is the backward parking, and to be the backward parking if the standard parking direction is the forward parking).

The "standard parking direction" may be fixed, or may be changed, for example, in accordance with an area in which the parking lot is located, a form of the parking lot, a location/installation environment of the parking lot, or the like. Specifically, for example, if there is a private house adjacent to the parking lot, the standard parking direction may be set to the forward parking in order to prevent exhaust gas from flowing into the private house. For example, in the case of a parking lot of a large-scale commercial facility with a relatively heavy vehicle traffic, the standard parking direction may be set to the backward parking in order to allow relatively smooth exit.

The "predetermined value" is a value for determining whether or not the parking direction of the vehicle 1 is set to the parking direction that is different from the standard parking direction. The predetermined value may be expressed not only as the number of the parking vehicles, but also as a ratio or a percentage. Considering an ambiguous number of parking spaces of the parking lot, the predetermined value may be desirably expressed as a ratio or a percentage. If the predetermined value is set, for example, to the number of the parking vehicles in the standard parking direction, it is substantially the same configuration as that of the aforementioned embodiment. If the predetermined value is expressed as a ratio or a percentage, naturally, an index value associated with the parking vehicles, which is compared with the predetermined value, is also expressed as a ratio or a percentage. The number of the parking vehicles described above is also an example of the index value.

By virtue of such a configuration, it is possible to appropriately determine the parking direction even if there is no parking vehicle in the parking lot.

SECOND MODIFIED EXAMPLE

In the aforementioned embodiment, the parking support apparatus 100 is mounted on the vehicle 1; however, the parking support apparatus 100 may be provided on the parking lot side.

For example, in a valet parking, an apparatus provided on the parking lot side may monitor a state in the parking lot (e.g., the number of parking vehicles, the number and position of empty parking spaces, etc.). Particularly in the valet parking in which the vehicle is automatically moved to a predetermined parking space, the apparatus provided on the parking lot side may calculate a route of the vehicle to the predetermined parking space in many cases. In this type of parking lot, the parking support apparatus 100 is desirably provided on the parking lot side, and the parking direction is also desirably determined on the parking lot side.

The expression "the vehicle is automatically moved to the predetermined parking space" is not limited to that an automatic driving function of the vehicle allows the vehicle to be automatically moved to the predetermined parking space", but also may conceptually include, for example, that the vehicle on a pallet (or a cargo carriage) is conveyed to the predetermined parking space together with the pallet, or that the vehicle is conveyed by a conveyor to the predetermined parking space.

Various aspects of embodiments of the present disclosure derived from the embodiments and modified examples explained above will be explained hereinafter.

A parking support apparatus according to an aspect of embodiments of the present disclosure is a parking support apparatus configured to automatically park a target vehicle in a target parking space, which is one parking space out of a plurality of parking spaces, the parking support apparatus provided with: an acquirer configured to obtain parking information indicating a parking posture of a parking vehicle in one or a plurality of parking spaces around the target parking space, out of the plurality of parking spaces; and a determinator configured to determine a parking posture of the target parking vehicle with respect to the target parking space, on the basis of the obtained parking information. In the aforementioned embodiment, the "vehicle 1" corresponds to an example of the target vehicle, the "feature analyzer 11" is an example of the acquirer, and the "host-vehicle direction determinator 12" corresponds to an example of the determinator. The "parking direction, i.e., the backward parking, the forward parking" in the aforementioned embodiment corresponds to an example of the parking posture with respect to the target parking space.

On the parking support apparatus, the parking posture of the target vehicle with respect to the target parking space may be determined on the basis of the parking information indicating the parking posture of the parking vehicle. For example, out of parking postures of parking vehicles indicated by the parking information, if there are a larger number of certain parking postures than the other parking postures, the parking posture of the target vehicle may be determined to be the certain parking posture. According to the parking support apparatus, it is possible to automatically determine the parking posture of the target vehicle.

In an aspect of the parking support apparatus, the determinator is configured in such a manner (i) that if an index value associated with a parking vehicle in a parking posture that is different from a reference posture is greater than or equal to a predetermined value, the determinator determines the different parking posture to be the parking posture of the target vehicle with respect to the target parking space, and (ii) that if the index value is less than the predetermined value, the determinator determines the reference posture to be the parking posture of the target vehicle with respect to the target parking space, on the basis of the obtained parking information.

According to this aspect, even if there is no parking vehicle in the parking lot, it is possible to appropriately determine the parking posture of the target vehicle. The "standard parking direction" in the aforementioned embodiment corresponds to an example of the reference posture.

The present disclosure may be embodied in other specific forms without departing from the spirit or essential characteristics thereof. The present embodiments and examples are therefore to be considered in all respects as illustrative and not restrictive, the scope of the disclosure being indicated by the appended claims rather than by the foregoing description and all changes which come in the meaning and range of equivalency of the claims are therefore intended to be embraced therein.

What is claimed is:

1. A parking support apparatus configured to automatically park a target vehicle, comprising:
one or more processing circuits configured to:
obtain a position of an empty parking space out of a plurality of parking spaces in a parking lot as a target parking space for the target vehicle to park;
determine a location of the parking lot
determine a predetermined parking posture for the parking lot based on the location of the parking lot, wherein the predetermined parking posture is determined from among a forward parking and a backward parking, wherein the forward parking is a parking posture when a vehicle moves forward and enters a parking space, and the backward parking is a parking posture when a vehicle moves backward and enters a parking space;
obtain parking information including whether a parking posture of a parked vehicle is the forward parking or &the backward parking in at least one of the plurality of parking spaces around the target parking space in the parking lot, wherein, (i) if a percentage of vehicles parked in the plurality of parking spaces in a parking posture that is different from the predetermined standard parking posture, which is one of the forward parking or the backward parking, is greater than or equal to a predetermined value, determine the different parking posture to be a parking posture of the target vehicle with respect to the target parking space, and (ii) if the percentage of vehicles is less than the predetermined value, determine the predetermined standard parking posture to be the parking posture of the target vehicle with respect to the target parking space; and
automatically perform parking of the target vehicle in the target parking space in accordance with the determined parking posture, which is the forward parking or the backward parking.

2. A parking support method for automatically parking a target vehicle in a target parking space, which is one parking space out of a plurality of parking spaces in a parking lot, said parking support method comprising:
identifying an empty parking space out of the plurality of parking spaces as the target parking space;
determining a location of the parking lot
determining a predetermined parking posture for the parking lot based on the location of the parking lot, wherein the predetermined parking posture is determined from among a forward parking and a backward parking, wherein the forward parking is a parking posture when a vehicle moves forward and enters a parking space, and the backward parking is a parking posture when a vehicle moves backward and enters a parking space;
obtaining parking information indicating whether a parking posture of a parked vehicle is the forward parking or a-the backward parking in at least one of the plurality of parking spaces around the target parking space in the parking lot, out of the plurality of parking spaces, after the target parking space has been identified, wherein:

(i) if a percentage of vehicles parked in the plurality of parking spaces in a parking posture that is different from the predetermined standard parking posture, which is one of the forward parking or the backward parking, is greater than or equal to a predetermined value, determining the different parking posture to be a parking posture of the target vehicle with respect to the target parking space, and (ii) if the percentage of vehicles is less than the predetermined value, determining the predetermined standard parking posture to be the parking posture of the target vehicle with respect to the target parking space; and performing parking of the target vehicle in the target parking space in accordance with the determined parking posture, which is the forward parking or the backward parking.

3. A parking support method for automatically parking a target vehicle, comprising:

obtaining a position of an empty parking space out of a plurality of parking spaces in a parking lot as a target parking space for the target vehicle to park;

determining a location of the parking lot determining a predetermined parking posture for the parking lot based on the location of the parking lot, wherein the predetermined parking posture is determined from among a forward parking and a backward parking, wherein the forward parking is a parking posture when a vehicle moves forward and enters a parking space, and the backward parking is a parking posture when a vehicle moves backward and enters a parking space;

obtaining parking information including whether a parking posture of a parked vehicle is the forward parking or ftthe backward parking in at least one of the plurality of parking spaces around the target parking space in the parking lot, wherein (i) if a percentage of vehicles parked in the plurality of parking spaces in a parking posture that is different from the predetermined standard parking posture, which is one of the forward parking or the backward parking, is greater than or equal to a predetermined value, determining the different parking posture to be a parking posture of the target vehicle with respect to the target parking space, and (ii) if the percentage of vehicles is less than the predetermined value, determining the predetermined standard parking posture to be the parking posture of the target vehicle with respect to the target parking space; and automatically performing parking of the target vehicle in the target parking space in accordance with the determined parking posture, which is the forward parking or the backward parking.

* * * * *